United States Patent [19]
Urashima et al.

[11] Patent Number: 5,908,797
[45] Date of Patent: *Jun. 1, 1999

[54] SILICON NITRIDE BASED SINTERED MATERIAL AND METHOD FOR PRODUCING SAME

[75] Inventors: Kazuhiro Urashima; Shigeru Iwase, both of Aichi, Japan

[73] Assignee: NGK Spark Plug Co., Ltd., Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,144

[22] Filed: Jul. 18, 1996

[30] Foreign Application Priority Data

Jul. 18, 1995 [JP] Japan .................................. 7-205416
Mar. 12, 1996 [JP] Japan .................................. 8-084583

[51] Int. Cl.$^6$ ........................ C04B 35/584; C04B 35/599
[52] U.S. Cl. ........................ 501/97.3; 501/98.2; 264/683
[58] Field of Search ................... 501/97, 97.3, 98.2; 264/683

[56] References Cited

U.S. PATENT DOCUMENTS

| | | | |
|---|---|---|---|
| 4,795,724 | 1/1989 | Soma et al. | 501/97 |
| 4,801,565 | 1/1989 | Matsui | 501/97 |
| 4,806,510 | 2/1989 | Kanai et al. | 501/97 |
| 5,200,374 | 4/1993 | Yamada et al. | 501/97 |
| 5,369,065 | 11/1994 | Yoshimura et al. | 501/97 |

FOREIGN PATENT DOCUMENTS

| | | |
|---|---|---|
| 3-164472 | 7/1991 | Japan . |
| 4-202060 | 7/1992 | Japan . |
| 6-305837 | 11/1994 | Japan . |

*Primary Examiner*—Karl Group
*Attorney, Agent, or Firm*—Morrison & Foerster LLP

[57] ABSTRACT

To provide a silicon nitride based sintered material having high strength and high hardness and superior in reliability, silicon nitride sintered material has a composition mainly composed of silicon nitride or Si—Al—O—N, and further comprises 0.5 to 3 wt % of a Mg component, calculated as MgO, and 3 to 10 wt % of a Yb component, calculated as $Yb_2O_3$. As a secondary crystal phase, the material contains one or more of $Yb_2Si_3N_4O_3$, $Yb_2Si_3N_2O_5$ and $Yb_4Si_2N_2O_7$. Silicon nitride or Si—Al—O—N comprises 20–50 vol % of needle-like crystals of the entire material.

16 Claims, 1 Drawing Sheet

5,908,797

SILICON NITRIDE BASED SINTERED MATERIAL AND METHOD FOR PRODUCING SAME

FIELD OF THE INVENTION

This invention relates to a silicon nitride based sintered material and a method for producing the same. The silicon nitride based sintered material of the present invention may be utilized with advantage as a structural material for a rolling roll, squeeze roll, bearing ball, drawing die or punching dies.

BACKGROUND

There has been known that there is a sintered material mainly composed of silicon nitride and containing rare earth elements, oxides of aluminum or magnesium or a compound oxides thereof as sintering aid, which material is superior in mechanical strength as a structural material.

Heretofore, as this type of the silicon nitride sintered material, there have been known a product obtained on mixing 1 to 7 wt % of powders of a sintering aid of $Yb_2O_3/MgAl_2O_4$=5/2 to 2/2 to 99 to 93 wt % of powders of silicon nitride and sintering the resulting mixture (JP-Patent Kokai Publication JP-A-3-164472), a product containing 3 to 6 wt % of $Yb_2O_3$ and 0.01 to 0.03 wt % of $MgAl_2O_4$ to powders of silicon nitride and composed of granular crystals and columnar crystals with a mean short diameter of 0.2 to 0.6 $\mu$m (JP Patent Kokai Publication JP-A-4-202060) and a product containing dispersed grains of $TiO_2$ in addition to columnar crystals of $Si_3N_4$ and a grain boundary phase formed by sintering aids such as $Y_2O_3$, MgO and/or $Al_2O_3$ etc., with the short diameter and the long diameter of the columnar crystal being not more than 0.3 $\mu$m and not more than 5 $\mu$m, respectively (JP Patent Kokai Publication JP-A-6-305837).

However, according to eager investigation of the inventors of the present invention, there is found a following problem in the art. Namely, above conventional techniques are concerned only with improving the mechanical strength, without being concerned with hardness. In addition, no reference is made to applicability of the material as a wear resistant member (slide member) or a jig for which both strength and hardness are required. Tracing experiments, conducted by the present inventors, have revealed that the material is not sufficient in hardness for application to a rolling roll, squeeze roll, bearing ball, drawing die or punching dies.

SUMMARY OF THE DISCLOSURE

It is therefore an object of the present invention to provide a silicon nitride based sintered material having high strength and high hardness and superior in reliability.

Other objects will become apparent in the entire disclosure.

For accomplishing above object, the present invention provides a silicon nitride based sintered material having a composition mainly composed of silicon nitride or Si—Al—O—N as a primary crystal phase, and further comprising 0.5 to 3 wt % of a Mg component, calculated as MgO, and 3 to 10 wt % of a Yb component, calculated as $Yb_2O_3$, wherein the silicon nitride sintered material contains one or more selected from $Yb_2Si_3N_4O_3$, $Yb_2Si_3N_2O_5$ and $Yb_4Si_2N_2O_7$ as a secondary crystal phase.

A suitable method for producing the silicon nitride sintered material includes mixing starting materials so that the materials are made up of 0.5 to 3 wt % of a Mg compound, calculated as MgO, 3 to 10 wt % of a Yb compound, calculated as $Yb_2O_3$, the balance being silicon nitride or Si—Al—O—N, molding the resulting mixture and sintering the molded product at 1300° to 1550° C. and preferably 1350° to 1550° C. Of these, the Mg compound and the Yb compound may be MgO and $Yb_2O_3$, respectively, or further such compounds as $MgCO_3$ or $Yb_2(OEt)_3$ ("Et" representing ethyl group) or the like which may yield the above oxides when fired alone.

The present invention provides following meritorious effect. That is, the silicon nitride based sintered material according to the present invention is superior in strength, hardness and reliability and may be expected to be used as wear resistant members (sliding members) or jigs such as rolling rolls, squeeze rolls, bearing balls, drawing dies or punching dies.

DESCRIPTION OF THE PREFERRED EMBODIMENTS

Figure 1:
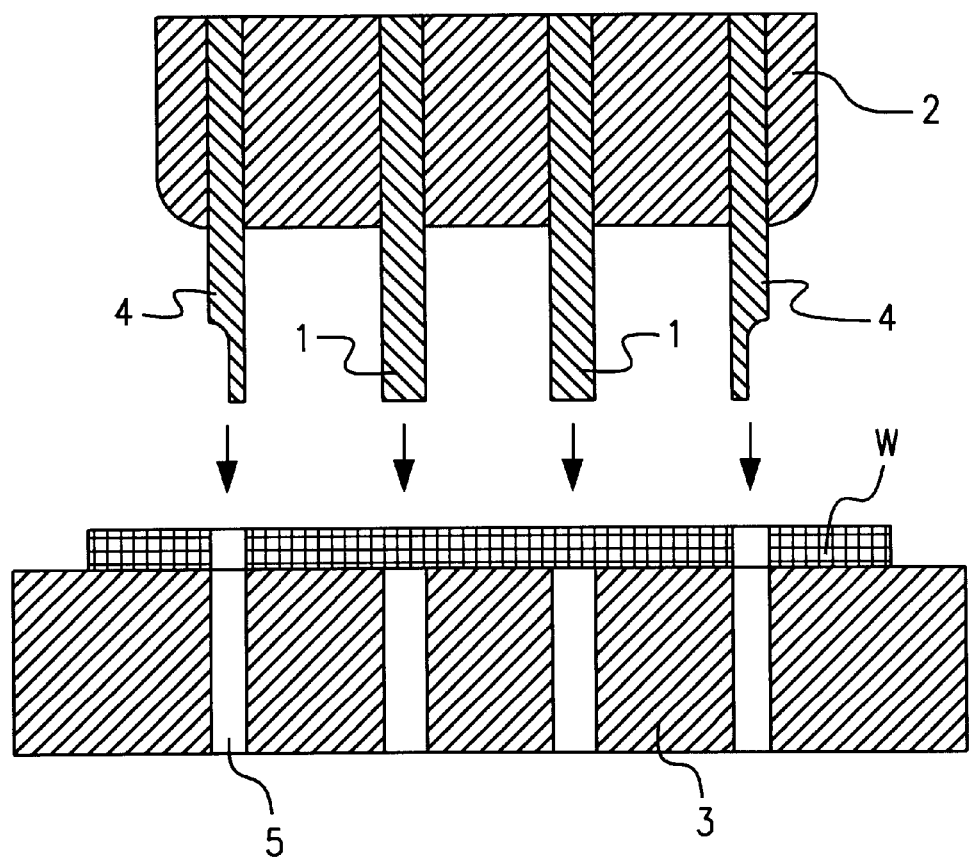
FIG. 1 is a cross-sectional view for illustrating the method for punching a plate using punching dies formed of a silicon nitride sintered material according to an embodiment of the invention.

A preferred example of the silicon nitride based sintered material is such a material wherein silicon nitride or Si—Al—O—N as a primary crystal phase is made up of needle-like crystals having a shorter diameter of 0.01 to 0.3 $\mu$m and an aspect ratio of not less than 15, the ratio of the X-ray diffraction intensity of said secondary crystal phase to the X-ray diffraction intensity of total silicon nitride or Si—Al—O—N is 5/10000 to 1/10 and wherein the needle-like crystals of silicon nitride or Si—Al—O—N accounts for 20 to 50 vol % based on the entire (volume of) sintered material. The remainder of the silicon nitride or Si—Al—O—N other than the needle-like (or columnar) crystals are substantially granular crystal grains.

In the above producing method, the Mg compound as sintering aid is reacted with other components to form a vitreous phase for improving density of the sintered material. A portion of the Yb compound forms the vitreous phase for improving density of the sintered material, while the remaining portion thereof remains in the grain boundary to form a secondary crystal phase as later explained and to promote yield and growth of the needle-like crystals of silicon nitride or Si—Al—O—N. For convenience, the crystals of needle-like crystals of silicon nitride or Si—Al—O—N is termed as "needle-like primary phase". If the amount of the Mg compound calculated as MgO is lower than 0.5 wt %, sintering becomes difficult, whereas, if the amount exceeds 3 wt %, the sintered material is lowered in strength due to segregation. If the amount of the Yb compound calculated as $Yb_2O_3$ is lower than 3 wt %, sintering becomes difficult, whereas, if the amount exceeds 10 wt %, the needle-like crystals become coarse. If the amount (number) of the needle-like crystals is short, the sintered material is lower in hardness, while the amount of the secondary crystal phase does not become proper.

$Yb_2O_3$, added as the sintering aid, is precipitated in the grain boundary as the secondary crystal phase composed of a crystal phase of $Yb_2Si_3N_4O_3$, $Yb_2Si_3N_2O_5$ and/or $Yb_4Si_2N_2O_7$. The amount of the vitreous phase is correspondingly reduced. However, the secondary crystal phase is harder than the vitreous phase and generally lower in the thermal expansion coefficient than the vitreous phase. Thus the residual stress is induced due to difference in thermal expansion with respect to silicon nitride or Si—Al—O—N, as a result of which the mechanical strength is increased. However, if the amount of the secondary crystal phase is less than 5/10000 relative to the total amount of silicon nitride or Si—Al—O—N as the primary (main) crystal phase in terms of the X-ray diffraction intensity ratio, the increasing effect in the mechanical strength is only poor, whereas, if the above amount is larger than 1/10, the residual stress becomes excessive to produce fine cracks thus producing an opposite effect, i.e., lowering the strength.

If the needle-like crystals are present as the needle-like primary phase, these crystals act as resistance against propagation of cracks. In addition, these crystals are entangled with one another to improve the strength further. However, if the short diameter is smaller than 0.01 μm or if the aspect ratio is smaller than 15, the needle-like crystals fail to provide sufficient resistance against propagation of cracking. On the other hand, if the short diameter is larger than 0.3 μm, the needle-like crystals themselves provide defects to give rise to an adverse effect of lowering the strength. In addition, if the amount of the needle-like crystals is less than 20 vol %, the crystals fail to provide sufficient resistance against the progress of cracking. Conversely, if the content of the needle-like crystals exceeds 50 vol %, the needle-like crystals agglomerate to one another to provide defects, thus lowering the strength.

EXAMPLES

Example 1

Powders of $Si_3N_4$ with a mean particle size of 0.5 μm and an α-ratio of 95% and sintering aids shown in Table 1 were weighed out so that the total weight equals to 100 wt % and mixed along with ethanol in a ball mill for 50 hours. The resultant mixture (slurry) was granulated by a spray drying method and molded by cold isostatic pressing (CIP) at a pressure of 5000 kgf/cm$^2$. The molded mass was held in $N_2$ for two hours at temperatures shown in Table 1 by way of primary sintering, and was subsequently held for two hours at temperatures shown in Table 1 under a $N_2$ gas pressure of 1000 atm, by way of secondary sintering, to give sintered samples of Nos. 1 to 20. As for sintered samples Nos. 14 to 18, these samples were pre-treated by being introduced into a sintering furnace for a pre-set time in an amount of oxygen ($O_2$ vol %) in the temperature rising process of from 0° C. to 600° C. at the primary sintering.

For each sintered sample, the amount of the crystal phase other than $Si_3N_4$ (secondary crystal phase), the amount of the needle-like crystals having a short diameter of 0.01 to 0.3 μm and an aspect ratio of not less than 15 (needle-like primary phase), the hardness Hv30 and the mean bending strength at room temperature were measured by the following methods:

The amount of the secondary crystal phase was measured on the basis of the intensity ratio between the peak of d=2.777 of $Yb_2Si_3N_4O_3$, the peak of d=2.777 of $Yb_2Si_3N_2O_5$ or the peak d=3.04 of $Yb_4Si_2N_2O_7$ with respect to the peak of [101] plane and [210] plane of β-$Si_3N_4$ (mean value) in the X-ray diffraction. The amount of the needle-like crystals of the needle-like primary phase was measured by grinding and polishing the sintered samples to a mirror surface, etching the mirror surface, followed by observing by a scanning type electron microscope (SEM), measuring the short diameter and the long diameter of $Si_3N_4$ particles from a photo with a magnification factor of 5,000 by image processing and calculating the area ratio of needle-like crystals satisfying the condition for the pre-set needle-like crystals with respect to the total area. The mean bending strength at room temperature was measured by cutting (slicing) a sintered material with a size of 40×40×40 mm and grinding to produce 30 test samples each sized 3×4×40 mm and measuring the bending strength at room temperature in accordance with JIS R1601 to find a mean value. The results are shown in Table 1.

As may be seen from Table 1, the sintered products of the present invention are all higher than 1500 MPa in bending strength and higher than 1600 in hardness (Hv), thus having high strength and hardness, while having a Weibull coefficient of not less than 20, thus being superior in reliability.

Comparative Example 1

In this Comparative Example, the sintered products were prepared under the substantially same conditions as those of Example 1 except that any one of the amount of the sintering aid, the amount of the needle-like primary phase and the amount of the secondary crystal phase was set so as to differ from those of Example 1, and the characteristics were evaluated under the same conditions as in Example 1. After the secondary sintering, only the sintered product No.R11 was gradually cooled from the maximum temperature to 800° C. at a temperature decreasing rate of 1° C./min without turning off the electrical power source of the furnace. The product was allowed to stand as from the time point when the temperature of 800° C. was reached. The measured results are shown in Table 2.

As may be seen from Table 2, the values of the bending strength of the samples were all as low as less than 1500 MPa. In addition, most of the samples were less than 1600 in hardness and lower than 20 in the Weibull coefficient. The reason is presumably as follows:

That is, since the amount of MgO was low in the sintered product No.R1, its density was as low as 3.1, such that the sample was not densely sintered. Conversely, the sintered sample No.R2 was excess in MgO such that observation by SEM revealed that MgO was segregated in the sintered sample thus lowering the strength value. With the sintered sample No.R3, the amount of $Yb_2O_3$ was low so that the amount of the yielded needle-like crystals was short. On the other hand, with the sintered sample No.R4, the amount of $Yb_2O_3$ was excessive so that the secondary crystal phase was excessive resulting in that the needle-like crystals become coarse and hence are diminished in the yielded amount, while the sample was lowered in hardness. With the sintered sample No.R5, the sintering time was short (a holding time of 0.5 hour) so that the yielded amount of the needle-like crystals was short. Conversely, with the sintered sample No.R6, the sintering time was too long (holding for six hours) so that the needle-like crystals were grown excessively and the short diameter of the sample was enlarged thus lowering the strength and hardness of the sample. With the sintered sample No.R9, the secondary sintering temperature was too high with a result that the components which should form the secondary crystal phase all formed the vitreous phase while the needle-like crystals were yielded in excessive amounts with agglomeration. The sintered sample No.R10 was fired insufficiently and hence the amount of needle-like crystals were short. With the sintered sample No.R11, which was cooled gradually, the secondary crystal phase was formed in an excessive amount and fine cracks were formed. With the sintered sample No.R12, in which the amount of $Yb_2O_3$ was small, the secondary crystal phase was not yielded, while the amount of the yielded needle-like crystals was short.

Comparative Example 2

A sintered sample No.R13 was prepared under the same conditions as those for the sintered sample No.4 of Example 1, except using $MgAl_2O_4$ in place of MgO, and the characteristics of the sample were measured in the same way as in Example 1.

The secondary crystal phase was not produced. The amount of the pre-set needle-like crystals was 10 vol %. The mean bending strength, hardness and the Weibull coefficient were 1450 MPa, 1600 and 15, respectively.

Comparative Example 3

A sintered sample No.R14 was prepared under the same conditions as those for the sintered sample No.4 of Example 1, except using $Y_2O_3$ in place of $Yb_2O_3$, and using 1 wt % of $Al_2O_3$ as a sintering aid, and the characteristics of the sample were measured in the same way as in Example 1.

The secondary crystal phase was not produced. The amount of the pre-set needle-like crystals was 15 vol %. The mean bending strength, hardness and the Weibull coefficient were 1450 MPa, 1650 and 18, respectively.

Example 2

In the present Example, the performance of the sintered material of the present invention as bearing balls was evaluated. 40 spherically-shaped sintered samples each were produced under the same conditions as those for the samples Nos.3, 6 and 19 of Examples 1 and the samples R6 or R8, except pressing the mixtures to a spherical shape by metal mold pressing under a pressure of 500 kgf/cm$^2$ before CIP molding and using the pressure of 1500 kgf/cm$^2$ at the time of CIP molding. The resulting sintered samples were ground and finished to bearing balls having the diameter of 9.525 mm (⅜ inch) and ball precision conforming to grade 10 of JIS B 1501.

Using these bearing balls, the crushing load test and the durability evaluation test were conducted under the following conditions. The test results are shown in Table 3.

Crushing Load Test

The crushing load was found in accordance with JIS B 1501. Ten measurement points were used. The mean values of the crushing load in these measurement points are shown in Table 3.

Durability Test

A durability tester (Gakushin-Type 2) manufactured by TAKACHIHO SEIKI CO. LTD. was used. As a test bearing, a deep groove ball bearing #6206, having a nylon retainer and eight balls, was used. As these balls were lubricated with turbine oil #32 and a radial load of 420 kgf was applied, the rotary shaft was rotated at an rpm of 3000. Time which elapsed until occurrence of unusual states such as peeling, spalling or cracks etc. was measured and used as an index of rolling fatigue durability. If no unusual state was observed when the time of 2000 hours was reached, measurement was terminated at this time point. The mean values of the rolling fatigue durability obtained by repeating tests 5 times are also shown in Table 3.

As may be seen from Table 3, the bearing balls formed of sintered samples Nos.3, 6 and 19 of the present invention are superior in durability and in crushing load. Conversely, the bearing ball formed of the No.R6 sintered sample was lower in the rolling fatigue durability and in the crushing load than the above three bearing balls despite the fact that the bearing ball was formed of sintered samples of the same composition of component materials as the No.2 sintered sample which is maximum in strength and hardness among the samples of Example 1.

The reason is presumably that the No.R6 sintered sample is excessively increased in short diameter due to growth of the needle-like crystals, and hence is lowered in strength and hardness. The bearing ball formed of the No.R8 sintered sample was lower in the rolling fatigue durability and in the crushing load than the above three bearing balls despite the fact that the bearing ball was formed of a sintered sample of the same composition of starting materials and of the same amount of the secondary crystal phase as the Nos.7 or 8 sintered samples which are relatively high in levels of strength and hardness among the samples of Example 1. The reason is presumably that, as shown in Table 2, the No.R8 sintered sample is lowered in strength and hardness due to shortage of needle-like crystals.

Example 3

In the present Example, the performance of the sintered sample of the present invention as a drawing die was evaluated.

Each one die-shaped sintered sample was produced under the same conditions as those for the Nos.3, 6 and 19 of Example 1 and Nos.R6 and R8 except metal mold pressing a starting mixture to a die shape under a pressure of 500 kgf/cm$^2$ before the CIP molding and using a pressure of 1500 kgf/cm$^2$ upon the CIP molding. The resulting sintered products, one for each, were ground and finished to drawing dies each having a through-hole having a diameter of 10 mm.

Using these drawing dies, pipes of SUS430, each having an outer diameter of 12 mm and a wall thickness of 0.8 mm, were cold drawn at a rate of 5 m/min. The time which elapsed until flaws occurred on the cold-rolled pipes was measured and used as an index for durability of the drawing dies. If no flaws occurred on the pipes after continuous cold rolling for 100 hours, measurement was terminated at the time point. The measured results are shown in Table 4.

As may be seen from table 4, the drawing dies formed of the sintered samples Nos.3, 6 and 19 of the present invention are longer in durability, whereas those formed of the sintered samples Nos.R6 and R8 were significantly shorter in durability. The reason is presumably the same as that for the test results for bearing balls.

Example 5

In the present Example, the performance of the sintered mass of the present invention as punching dies (punch and matrix) was evaluated.

Each one set of sintered samples in the shape of a punch and a matrix was produced under the same conditions as those for the Nos.3, 6 and 19 of Example 1 and Nos.R6 and R8 except metal mold pressing a starting mixture to the shape of a punch or a matrix under a pressure of 500 kgf/cm$^2$ before the CIP molding and using a pressure of 1500 kgf/cm$^2$ at the time of the CIP molding. The sintered sample in the shape of the punch was ground to a columnar-shaped punch of 5 mm in diameter. The sintered sample in the shape of a matrix was also ground and finished to a matrix having two trimming holes and two small-sized guide holes for receiving the punch.

Referring to FIG. 1, two punches 1, 1 were secured in a punch holder 2 of a punching machine, and a matrix 3 was set and secured on a lower table, not shown. Guide rods 4, 4 were secured to the punch holder 2 on both sides of the punches 1, 1. These guide rods 4, 4 serve for guiding the punches 1, 1 in association with guide holes 5, 5 in the matrix 3. A plate W of a copper alloy, 0.7 mm in thickness, was set on the matrix 3 and punched by moving the punches 1, 1 towards the matrix 3. This punching operation was repeated and the number of times of punching until occurrence of flaws on the edge of holes formed in the plate was measured and used as the index for durability of the punching matrix. If no flaws were produced in the plate after one million times of punching operations, the measurement was terminated at this time point. The measured results are shown in Table 5.

As may be seen from Table 5, the punching dies formed of sintered samples Nos.3, 6 and 19 were longer in durability. Conversely, the punching dies formed of the sintered samples Nos.R6 and R8 were shorter in durability. The reason is presumably the same as that for the test results for bearing balls.

It should be noted that any modification apparent in the art can be done without departing from the gist and the scope of the invention as disclosed herein and claimed.

TABLE 1

| No. | amount of sintering aid MgO | amount of sintering aid $Yb_2O_3$ | pre-treatment time [hours] | sintering temperature (°C.) primary | sintering temperature (°C.) secondary | secondary phase sort | secondary phase amount | needle-like crystals [vol %] | bending strength [MPa] | Weibull coefficient | hardness* |
|---|---|---|---|---|---|---|---|---|---|---|---|
| 1 | 0.5 | 10 | — | 1500 | 1500 | A | 4 | 34 | 1550 | 25 | 1610 |
| 2 | 3 | 10 | — | 1450 | 1500 | A | 8 | 46 | 1800 | 29 | 1800 |
| 3 | 3 | 4 | — | 1450 | 1450 | A | 1 | 47 | 1600 | 26 | 1750 |
| 4 | 2 | 10 | — | 1500 | 1450 | A | 5 | 32 | 1720 | 24 | 1770 |
| 5 | 3 | 8 | — | 1400 | 1450 | A | 2 | 40 | 1570 | 21 | 1820 |
| 6 | 3 | 8 | — | 1500 | 1450 | A | 1 | 45 | 152Q | 20 | 1650 |
| 7 | 3 | 8 | — | 1350 | 1400 | A | 8 | 21 | 1550 | 25 | 1740 |
| 8 | 3 | 4 | — | 1450 | 1300 | A | 4 | 25 | 1560 | 23 | 1730 |
| 9 | 3 | 4 | — | 1500 | 1550 | A | 1 | 50 | 1510 | 20 | 1600 |
| 10 | 3 | 4 | — | 1400 | 1300 | A | 5 | 20 | 1500 | 22 | 1730 |
| 11 | 3 | 5 | — | 1450 | 1500 | A | 3 | 30 | 1850 | 25 | 1680 |
| 12 | 3 | 5 | — | 1500 | 1500 | A | 5 | 48 | 1890 | 23 | 1720 |
| 14 | 3 | 8 | 4 | 1500 | 1500 | B | 3 | 47 | 1610 | 22 | 1680 |
| 15 | 3 | 8 | 2 | 1500 | 1500 | C | 2 | 42 | 1680 | 24 | 1670 |
| 16 | 2 | 8 | 2 | 1500 | 1500 | B | 3 | 35 | 1710 | 26 | 1690 |
| 17 | 2 | 9 | 2 | 1500 | 1500 | B | 5 | 32 | 1670 | 29 | 1630 |
| 18 | 1 | 9 | 2 | 1500 | 1550 | B | 3 | 20 | 1610 | 22 | 1650 |
| 19 | 3 | 3 | — | 1550 | 1550 | — | — | 27 | 1530 | 26 | 1640 |
| 20 | 2 | 5 | — | 1550 | 1550 | A | 2 | 31 | 1720 | 24 | 1610 |

Note: In column "secondary phase", A, B and C denote $Yb_2Si_3N_4O_3$, $Yb_2Si_3N_2O_5$ and $Yb_4Si_2N_2O_7$, respectively.
The "amount" denotes the values of X-ray diffraction intensity ratio of secondary phase to $\beta$-$Si_3N_4$ multiplied by 100.
No. 13 is missing number.
*Hardness: Hv

TABLE 2

| No. | amount of sintering aid MgO | amount of sintering aid $Yb_2O_3$ | pre-treatment time [hours] | sintering temperature (°C.) primary | sintering temperature (°C.) secondary | secondary phase sort | secondary phase amount | needle-like crystals [vol %] | bending strength [MPa] | Weibull coefficient | hardness* |
|---|---|---|---|---|---|---|---|---|---|---|---|
| R1 | 0.3 | 10 | — | 1500 | 1500 | A | 4 | 48 | 780 | 18 | 1350 |
| R2 | 4 | 8 | — | 1450 | 1450 | A | 3 | 45 | 1200 | 19 | 1750 |
| R3 | 3 | 2 | — | 1500 | 1500 | A | 2 | 15 | 1050 | 15 | 1570 |
| R4 | 2 | 11 | — | 1500 | 1500 | A | 11 | 10 | 1150 | 8 | 1550 |
| R5 | 3 | 9 | — | 1400 | 1400 | A | 8 | 18 | 1420 | 18 | 1570 |
| R6 | 3 | 10 | — | 1500 | 1450 | A | 4 | 13 | 1410 | 19 | 1540 |
| R7 | 3 | 8 | — | 1250 | 1400 | A | 8 | 10 | 1080 | 12 | 1580 |
| R8 | 3 | 8 | — | 1600 | 1600 | A | 4 | 5 | 1370 | 25 | 1510 |
| R9 | 3 | 4 | — | 1500 | 1650 | — | — | 53 | 1230 | 18 | 1590 |
| R10 | 3 | 4 | — | 1300 | 1300 | A | 10 | 10 | 1110 | 10 | 1560 |
| R11 | 3 | 8 | — | 1500 | 1500 | A | 12 | 47 | 1310 | 12 | 1650 |
| R12 | 3 | 2 | — | 1550 | 1550 | — | — | 20 | 1170 | 10 | 1590 |

Note: In column "secondary phase", A, B and C denote $Yb_2Si_3N_4O_3$, $Yb_2Si_3N_2O_5$ and $Yb_4Si_2N_2O_7$, respectively.
The "amount" denotes the values of X-ray diffraction intensity ratio of secondary phase to $\beta$-$Si_3N_4$ multiplied by 100.
*Hardness: Hv

TABLE 3

| No. | Rolling Fatigue Durability (hrs) | Crushing Load (kgf) |
|---|---|---|
| 3 | >2000 | 4550 |
| 6 | >2000 | 4330 |
| 19 | >2000 | 4210 |
| R6 | 1920 | 3520 |
| R8 | 1860 | 3150 |

TABLE 4

| No. | Durability of Drawing Die (hrs) |
| --- | --- |
| 3 | >100 |
| 6 | 90 |
| 19 | >100 |
| R6 | 50 |
| R8 | 40 |

TABLE 5

| No. | Durability of Punching Matrix (unit in ten thousand times) |
| --- | --- |
| 3 | >100 |
| 6 | >100 |
| 19 | >100 |
| R6 | 80 |
| R8 | 90 |

What is claimed is:

1. A silicon nitride based sintered material consisting essentially of:
   (i) a primary crystal phase of silicon nitride or Si—Al—O—N; and
   (ii) at least one secondary crystal phase selected from the group consisting of $Yb_2Si_3N_4O_3$, $Yb_2Si_3N_2O_5$ and $Yb_4Si_2N_2O_7$;
   wherein said silicon nitride based sintered material has
   (a) a Mg concentration of 0.5 to 3 wt %, calculated as MgO; and
   (b) a Yb concentration of more than 3 and not more than 10 wt %, calculated as $Yb_2O_3$,
   on the basis of the total weight of the silicon nitride based sintered material,
   wherein said primary crystal phase consists essentially of needle-shaped crystals of silicon nitride or Si—Al—O—N.

2. The silicon nitride sintered material as defined in claim 1 wherein said needle-shaped crystals of silicon nitride or Si—Al—O—N have a short diameter of 0.01 to 0.3 μm and an aspect ratio of not less than 15, and a ratio of X-ray diffraction intensity of said secondary crystal phase to X-ray diffraction intensity of the silicon nitride or Si—Al—O—N at 5/10000 to 1/10, and wherein the needle-shaped crystals of silicon nitride or Si—Al—O—N account for 20 to 50 vol % based on the entire sintered material.

3. The silicon nitride sintered material as defined in claim 1 which has a three-point bending strength pursuant to JIS R1601 of not less than 1500 MPa and a Weibull coefficient of not less than 20.

4. The silicon nitride sintered material as defined in claim 1 which has a bending strength of at least 1600 MPa.

5. The silicon nitride sintered material as defined in claim 3 which has a hardness (Hv) of at least 1600.

6. The silicon nitride sintered material as defined in claim 1 which has a Weibull coefficient of at least 23.

7. The silicon nitride sintered material as defined in claim 1 which has the secondary crystal phase of 1–8 in terms of x-ray diffraction intensity ratio of the secondary crystal phase to beta silicon nitride multiplied by 100.

8. The silicon nitride sintered material as defined in claim 1 which comprises needle-shaped crystals of 30–40 vol %.

9. The silicon nitride sintered material as defined in claim 1, wherein said needle-shaped crystals are silicon nitride.

10. The silicon nitride sintered material as defined in claim 1, wherein said needle-shaped crystals are Si—Al—O—N.

11. The silicon nitride sintered material as defined in claim 1, wherein said secondary crystal phase is $Yb_2Si_3N_4O_3$.

12. The silicon nitride sintered material as defined in claim 1, wherein said secondary crystal phase is $Yb_2Si_3N_2O_5$.

13. The silicon nitride sintered material as defined in claim 1, wherein said secondary crystal phase is $Yb_4Si_2N_2O_7$.

14. A method for producing a silicon nitride sintered material comprising:
   mixing starting materials so that the materials are made up of 0.5 to 3 wt % of a Mg compound, calculated as MgO, 3 to 10 wt % of a Yb compound, calculated as $Yb_2O_3$, the balance being silicon nitride or Si—Al—O—N,
   molding the resulting mixture, and
   sintering the molded product at a temperature of 1300° to 1550° C.,
   wherein the sintering is carried out under conditions such that at least one secondary crystal phase selected from the group consisting of $Yb_2Si_3N_4O_3$, $Yb_2Si_3N_2O_5$ and $Yb_4Si_2N_2O_7$ is produced in the silicon nitride based sintered material.

15. The method as defined in claim 14, wherein the sintering is carried out under conditions such that 20 to 50 vol % of needle-shaped crystals of silicon nitride or Si—Al—O—N are produced in the silicon nitride based sintered material.

16. A method for producing a silicon nitride sintered material according to claim 14, wherein the sintering is carried out under conditions such that needle-shaped crystals of silicon nitride or Si—Al—O—N are produced in 20 to 50 vol % based on the entire sintered material and that at least one secondary crystal phase selected from the group consisting of $Yb_2Si_3N_4O_3$, $Yb_2Si_3N_2O_5$ and $Yb_4Si_2N_2O_7$ is produced as a boundary phase in the silicon nitride based material.

* * * * *